May 22, 1956  J. J. LAWSER  2,747,072
TOASTER HEATING UNIT
Filed Sept. 11, 1953  2 Sheets-Sheet 1
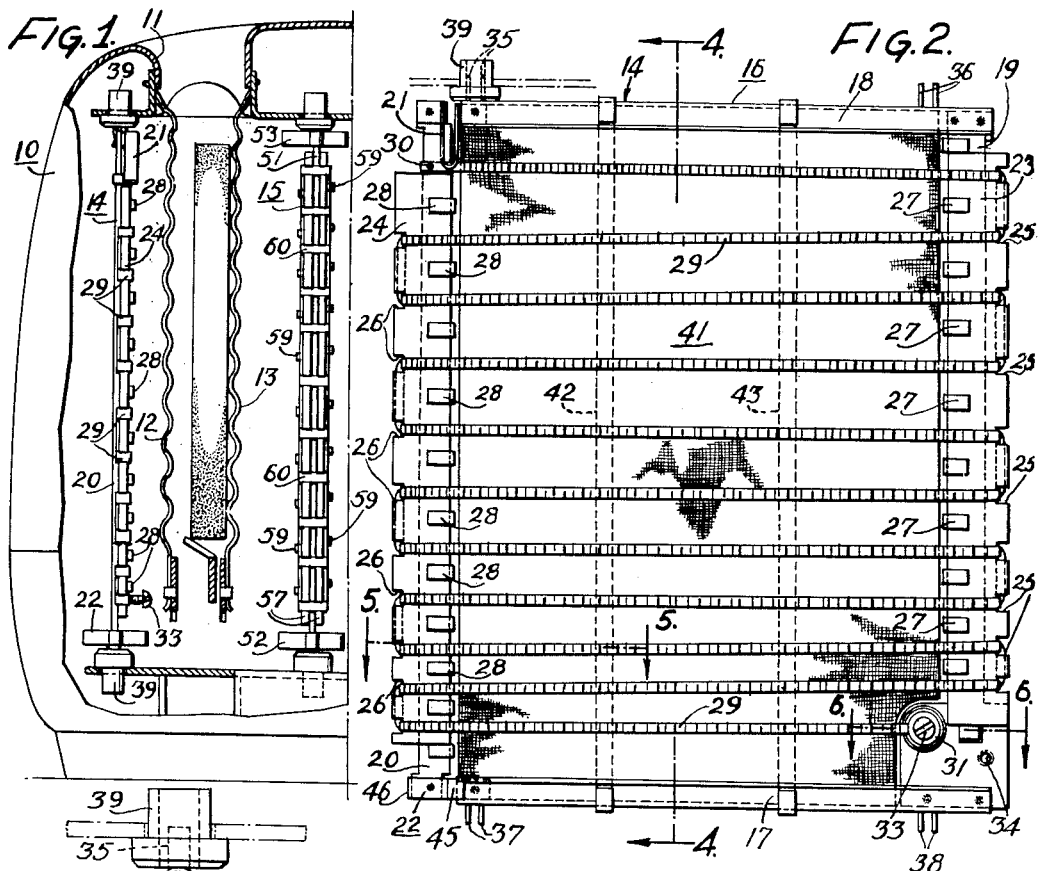
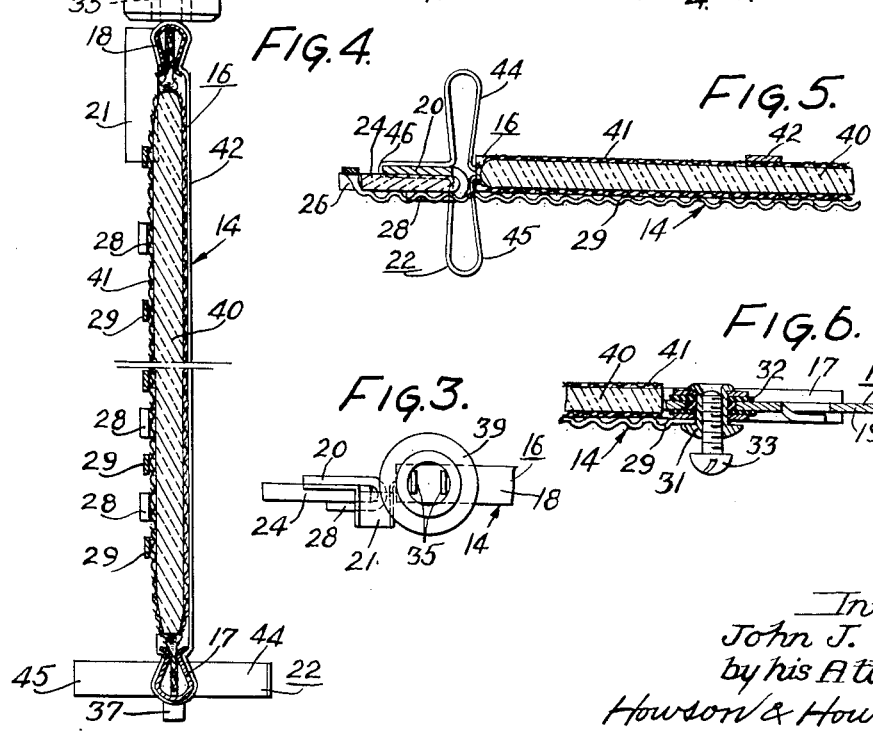
Inventor:
John J. Lawser
by his Attorneys
Howson & Howson

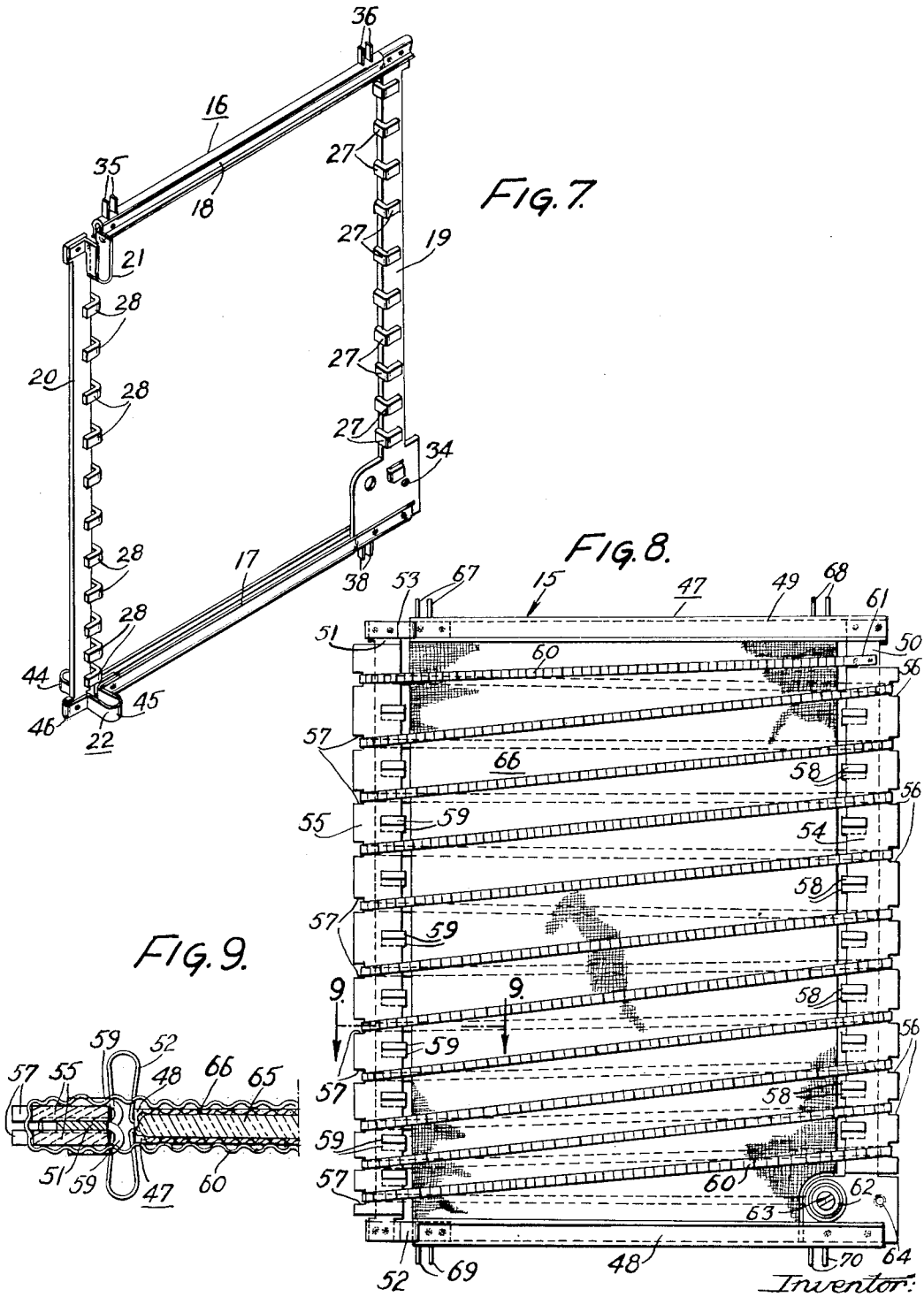

United States Patent Office 2,747,072
Patented May 22, 1956

2,747,072

TOASTER HEATING UNIT

John J. Lawser, Abington, Pa., assignor to Proctor Electric Company, Philadelphia, Pa., a corporation of Pennsylvania Application September 11, 1953, Serial No. 379,649

25 Claims. (Cl. 219—19)

This invention relates to heating units for bread toasters.

In the past, one of the problems in connection with bread toasters has been to provide efficient performance of a toaster during the toasting of successive bread slices starting with the toaster in a cold condition. This problem has involved reduction of the time to toast the first bread slice starting with the toaster in cold condition, and it has also involved minimization of the time difference between the initial toasting operation and subsequent toasting operations.

A solution of this problem was provided by the structure shown in U. S. Patent No. 2,576,632 issued November 27, 1951 to J. W. Myers, and assigned to the assignee of the present application. In that patent there is shown a toaster heating unit which is characterized in that it has associated with the heating element a backing of mineral fiber material, with the fibers of said material substantially in engaging relation with the heating element. Such heating unit has been referred to as a high speed heating unit because it toasts bread slices very rapidly. Furtheremore, it serves to minimize the time difference between the initial toasting operation and subsequent toasting operations. However, that unit is not entirely satisfactory commercially because the projecting fibers of the mineral fiber material tend to catch bread crumbs, and further because of the cost of the supporting framework.

One object of the present invention is to provide a commercially satisfactory solution of the above-mentioned problem.

Another object of the invention is to provide an improved toaster heating unit of the high speed type.

In toasters of the high speed type the heating elements heat and expand more rapidly and cool and contract more rapidly than the supporting structure. This change of length of the wire might result in overstressing the wire on the one hand or it may cause touching of adjacent wires or shorting of the wires on adjacent metal framework. Further, this change of length has also been found to otherwise maleffect the performance of the high speed element.

It is, therefore, another object of this invention to provide a high speed heating unit which will not be deleteriously affected by the rapid expansion and contraction of the heating element.

A further object of the invention is to provide a toaster heating unit which is sturdy in construction, neat in appearance and is capable of economic manufacture.

A further object of the invention is to provide such a unit which will operate efficiently over a long period of time.

Other objects and features of the invention will be apparent from the following detailed description.

In the accompanying drawings,

Fig. 1 is a fragmentary cross-sectional view of a toaster of the two-well type employing heating units constructed according to the present invention;

Fig. 2 is a front elevational view of one of the outer heating units of the toaster;

Fig. 3 is a partial plan view showing one of the elements for mounting the heating unit;

Fig. 4 is a sectional view taken on line 4—4 of Fig. 2;

Fig. 5 is a partial sectional view taken on line 5—5 of Fig. 2;

Fig. 6 is a partial sectional view taken on line 6—6 of Fig. 2;

Fig. 7 is a perspective view of the metal frame of the heating unit prior to assembly of the parts which compose the unit;

Fig. 8 is a face view of the central heating unit of the toaster shown in Fig. 1; and Fig. 9 is a partial sectional view taken on line 9—9 of Fig. 8.

Referring first to Fig. 1, the general type of toaster represented therein is well known and comprises two vertical bread wells into which two slices of bread may be placed, a central heating unit disposed between the bread wells and adapted to radiate heat from both sides toward the two bread slices, and two outer heating units disposed respectively at the outer sides of the bread wells and adapted only to radiate heat inwardly toward the associated bread slice. In the illustration of Fig. 1, the toaster casing is shown at 10, and the entrance to one of the bread wells is shown at 11. A bread slice inserted through the entrance 11 is supported in the bread well defined by elements 12 and 13. One of the outer heating units is shown at 14 while the central heating unit is shown at 15. These units are constructed in accordance with the present invention as now to be described.

Each outer heating unit, as represented at 14, in Fig. 1, is constructed as shown in Figs. 2 to 7 to which reference is made. The unit comprises an open metal frame 16 (see Fig. 7) of substantially rectangular form, having a bottom 17 of channel-shaped cross-section as shown in Fig. 4, a top 18 of inverted channel-shape, a side 19 fixedly secured to the bottom and top, as by being welded thereto, and an opposite side 20 which is not directly connected to the bottom and top but is connected thereto by means of spring elements 21 and 22. The latter elements exert forces tending to expand the frame widthwise, the purpose of which is to keep the heating element taut at all times, as hereinafter described. Extending along sides 19 and 20 in engagement therewith are insulating strips 23 and 24 which may be composed of any suitable electrical insulation material, such as asbestos millboard or mica. As may be seen in Figs. 2 and 5, these insulating strips extend widthwise beyond the associated metal sides 19 and 20 of the frame. Spaced notches 25 and 26 are provided along the outer edges of the insulating strips. The insulating strips are held securely in place by means of spaced fingers 27 and 28 which are integral with the sides 19 and 20 (see Fig. 7) and which are bent about the inner edge of the associated insulating strip and against the front face thereof. As may be seen in Fig. 2, the fingers are vertically offset with respect to the notches in the insulating strips. In the illustrated embodiment, the fingers extend from the inner edges of the frame members 19 and 20 but the fingers may be formed as lancings from the frame members.

The above-described assembly forms the supporting structure for the heating element 29. This element preferably takes the form of a corrugated metal ribbon which extends back and forth across the front of the supporting structure between the sides thereof and is laced onto the notched insulating strips. The upper end of the heating element is fastened to the metal frame at 30, as by welding, and the element extends from that point to the uppermost notch of strip 23, then downwardly behind the outer edge of the strip to the second notch, then across the front of the frame to the first notch in strip 24, then downwardly behind the edge of the strip to the second notch, then across the front of the frame to the third notch of strip 23, and so on. The lower end of the heating element is secured to a terminal bushing 31 in the lower right-hand corner of the frame, which bushing is insulated from the frame by insulating means shown at 32 in Fig. 6. The terminal bushing is internally threaded to receive a screw 33 for attachment of one of the line conductors. The other line conductor is secured to the frame, and for this purpose an aperture 34 is provided in the lower right-hand corner of the metal frame in proximity to the terminal 31. The aperture 34 is tapped to receive a screw (not shown) for connecting one of the line conductors to the metal frame. By this arrangement the metal frame not only provides a strong support but it also serves as an electrical conductor to interconnect the upper end of the heating element 29 to the line conductor which is secured at aperture 34 in proximity to terminal screw 33. The proximity of the two terminal points facilitates connection of the line conductors.

Because the metal frame is used as an electrical conductor, the heating unit is mounted in the toaster so as to be electrically insulated from the metal casing and associated parts of the toaster. To this end, there are provided, substantially at the corners of the frame, four pairs of projecting tabs numbered 35 to 38 which are preferably formed integrally with the top and bottom as lancings therefrom. Each pair of tabs is adapted to fit frictionally within the bore of a small porcelain bushing such as shown at 39 in association with tabs 35. As shown in Fig. 1, the heating unit is supported within the toaster by means of these bushings which are located within holes in the framework, the bushings serving to insulate the heating unit from the toaster casing and associated parts.

The heating unit further comprises a backing in association with the heating element. Preferably, the backing comprises a mat or pad 40 of glass wool and an envelope 41 thereabout composed of glass cloth. The envelope 41 may be in the form of a piece of glass cloth wrapped about the mat or pad 40 with its vertical edges overlapped at the rear of the heating unit and with its upper and lower edges inserted in and clamped by the bottom and top channel members 17 and 18 of the metal frame which thus serves to hold the backing in place. It should be noted that the channel members serve to clamp the upper and lower edges of the backing and thus serve to rigidify the backing and hold it stationary. Metal strips 42 and 43 may extend vertically at the rear of the heating unit and may have their ends bent or crimped over the bottom and top members to hold them in place, the purpose of these strips being to hold the backing in contiguous relation to the heating element and further to retain the overlapped portions of the envelope 41 at the rear of the unit. The mat or pad 40 may be composed of ¼ inch thick glass wool manufactured by Owens-Corning Fiberglas Company under the designation PF–316. The envelope or wrapping 41 may be composed of glass cloth of .007 inch thickness such as manufactured by Soule Mills under the designation SM–528 or as manufactured by Owens-Corning Fiberglas Company under the designation ECC–127.

After assembly the backing is heated sufficiently to drive off starch and other binders that may be in the glass wool or glass cloth. These foreign materials in the backing would otherwise burn out slowly during toasting and destroy the neat appearance of the outside of the heating element. The binders and starch permit easy handling of the backing during assembly.

Because of the high thermal insulation properties of the backing combined with its low thermal mass, and its ability to reduce heat loss due to convection because of the substantially intimate contact of the backing with the heating element wires, the heating wire rises very rapidly in temperature to its full operating temperature and consequently the unit operates at high speed. It should be pointed out that the backing envelope 41 is quite resilient because of the inner pad 40 of glass wool. This helps insure intimate contact between the heating element and the backing. As a result of the high operating temperature of the heating wire there is considerable thermal expansion in the wire which tends to produce sagging of the generally horizontal runs. However, this is prevented by the horizontal expansion of the supporting frame by the spring elements 21 and 22 hereinbefore mentioned, which are generally in the form of U-shaped springs. As previously mentioned, the backing is held at its upper and lower edge by the clamping channel members 17 and 18. As the runs of the heating element expand and contract, they slide over the surface of the backing and there is no stretching or buckling of the backing. Because the runs of the heating wire are held taut in parallel relation to the surface of the backing there is substantially no pressure between the heated wires and glass cloth. The heating wire is able to operate at a high temperature without melting the glass cloth which radiates thermal energy received by it from the heating wire.

In the illustrated embodiment, the upper spring element 21 is in the form of a vertical U-shaped element having lateral end extensions connected respectively to the top 18 and the side 20, as by being welded thereto, one of said extensions being inserted within the end of the channel-shaped top 18 and the other engaging side 20. This spring element is of relatively small dimension at right angles to the plane of the heating unit, so that it does not project sufficiently far from the front face of the heating unit to interfere with a bread slice inserted in the adjacent bread well. The lower spring element 22 is shaped to form two oppositely directed U-shaped sections 44 and 45 extending at right angles to the general plane of the heating unit, as may be seen in Fig. 5. The central portion of this element is bent about the side 20, as shown at 46, while its end portions are inserted in the adjacent end of the channel-shaped bottom 17. The spring element is fastened to the associated frame members, as by being welded thereto. The double U form of the spring element 22 provides a balanced arrangement which serves to maintain the proper relation between the side 20 and the rest of the metal frame.

Figs. 8 and 9 show the structure of the central heating unit 15 of Fig. 1. This unit comprises a metal frame 47 which is identical with the frame of the first-described unit except for the slight modifications hereinafter mentioned. As in the case of the previously described unit, the frame 47 has channel-shaped bottom and top members 48 and 49, a side 50 rigidly secured to the bottom and top members as by welding, and an opposite side 51 connected to the bottom and top members by spring elements 52 and 53 which may be welded to the associated parts. In this instance both of the spring elements 52 and 53 are similar in structure and arrangement to the bottom spring element 22 in the previously described unit.

Pairs of insulating strips 54 and 55 are associated respectively with the sides 50 and 51 of the frame. The insulating members of each pair are disposed adjacent the opposite sides or faces of the associated frame member, as may be seen in Fig. 9, which shows the disposition of the two insulating strips 55 on opposite sides of frame member 51. The insulating strips extend widthwise beyond the associated sides of the frame, and the extended outer edge portions of the insulating strips are provided with spaced notches 56 and 57. The frame sides 50 and 51 have spaced pairs of fingers 58 and 59, and as may be seen in Fig. 9, the two fingers of each pair are turned in opposite directions about the inner edges of the associated insulating strips and engage the outer faces of the strips. Thus, the two insulating strips associated with each side of the frame are securely held in place by the spaced pairs of fingers. As may be seen in Fig. 8, the pairs of fingers are arranged in vertically offset relation to the notches of the insulating strips.

The heating element 60 is spirally wound about the supporting structure so that there are substantially parallel runs of the heating element on both sides or faces of the unit. The upper end of the heating element 60 is connected to the frame at 61 as by welding, and the heating element extends across one face of the frame and through the uppermost notch of insulating strips 55, then back across the opposite face of the frame and through the uppermost notch of insulating strips 54, then across the first face of the frame and through the second notch of insulating strips 55, and so on. The lower end of the heating element is connected to terminal 62 which is insulated from the frame and which has an associated screw 63 for connection of one of the line conductors. A threaded aperture 64 is provided in the frame in proximity to terminal 62 to enable connection of the other line conductor to the frame by means of a screw, not shown, inserted in the aperture. As in the case of the first-described heating unit, the metal frame serves as an electrical conductor to conduct current between one of the line conductors and the upper end of the heating element.

Within the frame and the heating element is a backing similar to that of the first-described heating unit and comprising a glass wool mat or pad 65 and a glass cloth envelope 66. The lower and upper edges of the wrapping constituting the envelope are disposed within and held by the channel frame members 48 and 49 as in the first-described unit. In this instance, however, the heating element extends on both sides or faces of the backing and, therefore, serves to retain the backing, keeping the wire in substantially contiguous relation to the backing, and it is unnecessary to provide retaining strips as in the first-described unit.

The metal frame is provided with four pairs of extending tabs 67 to 70, as in the first-described unit, to receive porcelain insulators through which the heating unit is supported in the toaster.

The heating unit construction provided by this invention has been found from actual tests to provide extremely rapid toasting of successive bread slices, with very little time difference between the initial toasting operation and succeeding toasting operations. Furthermore, the tests have shown that the heating unit maintains its efficiency and can be expected to operate efficiently throughout the life of a toaster. Further still, the heating unit remains neat in appearance, and the backing employed has the additional advantage that it is able to withstand jabs by a fork or the like as when the user probes into the toaster to loosen a bread slice.

While particular embodiments have been illustrated and described, the invention is not limited thereto, but contemplates such further embodiments and modifications as may occur to those skilled in the art.

I claim:

1. In a heating unit for a bread toaster, an open metal frame of substantially rectangular form, at least two insulating strips disposed respectively at two opposed sides of the rectangular frame and extending along said sides, a plurality of spaced fingers along each of said sides integral therewith and engaging the associated insulating strip to hold it in place, a heating element extending between said sides and supported by said insulating strips, said heating element engaging each of said strips at spaced points, the number of said fingers corresponding substantially to the number of said points, said fingers being aligned with the portions of said strips between said points, and a backing for said heating element supported by said frame and disposed immediately adjacent to the heating element.

2. A heating unit according to claim 1, wherein one of said sides is connected to the rest of the frame by U-shaped spring elements which exert forces tending to expand the frame so as to keep the heating element taut at all times.

3. A heating unit according to claim 2, wherein at least one of said U-shaped spring elements extends parallel to the general plane of the heating unit.

4. A heating unit according to claim 2, wherein at least one of said spring elements comprises two oppositely-directed U-shaped sections extending at right angles to the general plane of the heating unit.

5. In a heating unit for a bread toaster, an open metal frame of substantially rectangular form, a pair of insulating strips disposed respectively at two opposed sides of the rectangular frame and extending along said sides, each of said strips having spaced notches along its outer edge, a plurality of spaced fingers along each of said sides integral therewith and engaging the associated insulating strip to hold it in place, the number of said fingers corresponding substantially to the number of said notches, said fingers being aligned with the portions of said strips between said notches, a heating element wound back and forth across said frame in a single plane and held by the notches in said strips, and a backing for said heating element supported by said frame and disposed immediately adjacent to the heating element.

6. A heating unit according to claim 5, wherein one of said sides is connected to the rest of the frame by spring elements which support said one side and exert forces tending to expand the frame so as to keep the heating element taut at all times.

7. In a heating unit for a bread toaster, an open metal frame of substantially rectangular form, a pair of insulating strips at each of two opposed sides of said frame, the strips at each side engaging opposite faces thereof, each of said strips having spaced notches along its outer edge, a plurality of spaced fingers along each of said sides integral therewith and engaging the associated insulating strips to hold them in place, the number of said fingers corresponding substantially to the number of said notches, said fingers being aligned with the portions of said strips between said notches, a heating element wound about said frame between said sides and held by the notches in said strips, whereby to provide a double faced heating unit, and a backing supported by said frame within the opposed portions of the heating element and immediately adjacent thereto.

8. A heating unit according to claim 7, wherein one of said sides is connected to the rest of the frame by spring elements each comprising two oppositely-directed U-shaped sections extending at right angles to the general plane of the heating unit.

9. In a heating unit for a bread toaster, an open frame of substantially rectangular form, one side of the frame being movable relative to the rest of the frame to permit expansion of the frame in one direction, a heating element supported by said frame and extending between said movable side and the opposite side of the frame, and a backing for said heating element immediately adjacent thereto and held along two of its edges by the other two opposed sides of the frame.

10. A heating unit according to claim 9, wherein said other two opposed sides of the frame are channel shaped and serve to clamp said two edges of the backing.

11. A heating unit according to claim 10, further including extending tabs on said other two opposed sides of said frame, and hollow insulating buttons held by said tabs for holding the heating unit in a toaster.

12. A heating unit according to claim 10, wherein the backing for said heating element comprises a glass wool pad and a glass cloth wrapping about said pad.

13. In a heating element construction for toasters of dual-compartment type, a center heating element and two outside heating elements, said center heating element comprising a pair of sheets of insulation, glass fibers between said sheets serving as a heat baffle and reflecting means, and a resistance element wound around said sheets.

14. In a heating unit for a bread toaster, an open metal frame of substantially rectangular form, at least two insulating strips disposed respectively at two opposed sides of the rectangular frame and extending along said sides, a plurality of fingers along each of said sides integral therewith and engaging the associated insulating strip to hold it in place, a heating element extending between said sides and supported by said insulating strips, and a backing for said heating element supported by said frame and disposed immediately adjacent to the heating element, said backing comprising a glass wool pad and a wrapping thereabout of glass cloth.

15. A heating unit according to claim 13, wherein the other two opposed sides of the rectangular frame are channel-shaped, and the associated opposed edge portions of said backing are disposed in the channel-shaped sides and held thereby.

16. A heating unit according to claim 14, including insulating buttons on said channel-shaped sides for holding the heating unit in a toaster.

17. In a heating unit for a bread toaster, an open metal frame of substantially rectangular form, a pair of insulating strips disposed respectively at two opposed sides of the rectangular frame and extending along said sides, each of said strips having spaced notches along its outer edge, a plurality of fingers along each of said sides integral therewith and engaging the associated insulating strip to hold it in place, a heating element wound back and forth across said frame in a single plane and held by the notches in said strips, and a backing for said heating element supported by said frame and disposed immediately adjacent to the heating element, said backing comprising a glass wool pad and a wrapping thereabout of glass cloth.

18. A heating unit according to claim 16, wherein the other two opposed sides of the rectangular frame are channel-shaped, and the associated opposed edge portions of said backing are disposed in the channel-shaped sides and held thereby.

19. In a heating unit for a bread toaster, an open frame of substantially rectangular form, one side of the frame being movable relative to the rest of the frame to permit expansion of the frame in one direction, U-shaped spring elements connected between said movable side and the rest of the frame to support the movable side, a heating element supported by said frame and extending between said movable side and the opposite side of the frame, and a backing for said heating element supported by said frame immediately adjacent to the heating element.

20. A heating unit according to claim 18, wherein at least one of the U-shaped spring elements extends parallel to the general plane of the heating unit.

21. A heating unit according to claim 18, wherein at least one of said spring elements comprises two oppositely-directed U-shaped sections extending at right angles to the general plane of the heating unit.

22. In a heating element construction for toasters of the multi-compartment type, a heating element located between two adjacent compartments and forming the dividing wall therebetween, and two further heating elements respectively spaced in opposite directions from the opposite walls of said first-mentioned element and forming the opposite walls of said adjacent compartments, said first-mentioned heating element comprising a pair of sheets of insulation, glass fibers between said sheets serving as a heat baffle and reflecting means, and a resistance element wound around said sheets.

23. In a heating element construction for a toaster having means for supporting a slice of bread within the toaster and a pair of said heating elements forming opposed walls of a toasting compartment and mounted in spaced relation to opposite sides of the bread-supporting position established by said means, the heating element construction comprising a face portion formed of a sheet of glass cloth lying substantially parallel to and facing said bread-supporting position, said sheet of glass cloth being backed by a pad of glass wool fibers confined by said glass cloth and also confined on its opposite side to hold it against said glass cloth and serving as a heat baffle and reflecting means, and a resistance element having a plurality of conductive heating runs lying substantially against said face portion of said glass cloth in confronting relation to said bread slice supporting position in heating relation thereto.

24. A heating element construction as defined in claim 23, in which said heating runs of said resistance element extend substantially horizontally across said glass cloth face portion, and in which portions of said resistance element between successive runs are mounted laterally beyond said face portion upon a support and resilient means are connected to said support and biased in a direction to hold said resistance element runs taut and in parallel relation to said glass cloth.

25. A heating element construction as defined in claim 23, in which glass cloth sheet portions are provided on both the front and rear sides of said glass wool pad in confining relation thereto.

References Cited in the file of this patent

UNITED STATES PATENTS

| Re. 23,439 | Young | Dec. 11, 1951 |
| 533,795 | Edwards | Feb. 5, 1895 |
| 1,957,227 | Reimers et al. | May 1, 1934 |
| 2,079,611 | Harvey | May 11, 1937 |
| 2,419,355 | Koci | Apr. 22, 1947 |
| 2,462,607 | Browne | Feb. 22, 1949 |
| 2,548,511 | Anderson | Apr. 10, 1951 |
| 2,572,695 | Briscoe et al. | Oct. 23, 1951 |
| 2,576,632 | Myers | Nov. 27, 1951 |
| 2,598,592 | Olson et al. | May 27, 1952 |
| 2,599,038 | Aske | June 3, 1952 |
| 2,659,798 | Olving | Nov. 17, 1953 |